／United States Patent
Banks

[15] 3,697,961
[45] Oct. 10, 1972

[54] DIGITAL ANSWERBACK CIRCUIT

[72] Inventor: Howard F. Banks, Raleigh, N.C.
[73] Assignee: Corning Glass Works, Corning, N.Y.

[22] Filed: May 17, 1971
[21] Appl. No.: 144,062

[52] U.S. Cl. ....... 340/172.5, 340/163 R
[51] Int. Cl. ....... G08b 11/00, G06f 1/04
[58] Field of Search .340/172.5, 147 R, 163 R, 166 R

[56] References Cited

UNITED STATES PATENTS

| | | | |
|---|---|---|---|
| 3,248,711 | 4/1966 | Lewin | 340/172.5 X |
| 3,395,398 | 7/1968 | Klein | 340/172.5 |
| 3,577,187 | 5/1971 | Benson | 340/163 R |
| 3,596,256 | 7/1971 | Alpert et al. | 340/172.5 |
| 3,634,829 | 1/1972 | Campi et al. | 340/172.5 |
| 3,651,479 | 5/1972 | Lambert | 340/172.5 |

*Primary Examiner*—Harvey E. Springborn
*Attorney*—Clarence R. Patty, Jr., Walter S. Zebrowski and James C. Kesterson

[57] ABSTRACT

A digital answerback circuit for providing a computer with information identifying a remote terminal is disclosed. A signal received from the computer initiates operation of the answerback circuit. This signal enables an electronic counter to count clock pulses and produce a binary output which corresponds to the number of clock pulses counted. An electronic decoder then decodes the binary output and produces an output signal on a specific and separate line for each clock pulse received. Each decoder output signal is applied to a separate and specific input of a read only memory which results in a code, preprogrammed for the specific input and contained in the read only memory, being sent back to the computer. These preprogrammed codes contain the necessary identification information and may further contain any other information useful or necessary to the computer.

20 Claims, 5 Drawing Figures

INVENTOR.
Howard F. Banks
BY James C. Kesterson
ATTORNEY

INVENTOR.
Howard F. Banks.
BY
James C. Kesterson
ATTORNEY

INVENTOR.
Howard F. Banks
BY
James C. Kesterson
ATTORNEY

INVENTOR.
Howard F. Banks
BY
James C. Kesterson
ATTORNEY

INVENTOR.
Howard F. Banks
BY
James C. Kesterson
ATTORNEY

DIGITAL ANSWERBACK CIRCUIT

BACKGROUND OF THE INVENTION

1. Field of the Invention

This invention relates to identification of a remote facility by apparatus producing coded information, and more specifically to digital electronic circuitry for supplying such coded information identifying a remote computer terminal when such identification is requested by a central computer.

2. Description of the Prior Art

As modern computer complexes expand to include more and more additional remote terminals, presently available methods of accurately identifying each remote terminal are becoming less and less satisfactory. Typically, when a computer is addressed by a remote terminal, the computer sends a signal back to the remote terminal requesting information identifying the remote terminal. The identifying information must comprise an exact sequence of coded signals within a fixed time period or the computer will not process further information from the terminal. In the past, mechanical devices have been used to produce the identification or "answerback" codes. However, this mechanical approach has several disadvantages that are becoming less and less acceptable as the number of remote terminals in a computer complex increases. These disadvantages include low speed, the requirement of a substantial amount of power, noise, the requirement of substantial maintenance due to mechanical wear, and the difficulty encountered in changing the identification codes.

SUMMARY OF THE INVENTION

It is an object of the present invention to provide fast economical circuitry for supplying coded identification information from a first apparatus to a second apparatus which overcomes the heretofore noted disadvantages of the presently available answerback devices.

Briefly, the digital answerback circuit of this invention comprises means for providing clock pulses, and an electronic counter having at least one input line for receiving said clock pulses. The electronic counter provides, on a plurality of output lines as each clock pulse is received, a combination or set of binary output signals which represents a count of the number of clock pulses received. Also included in this invention is an electronic decoder having a plurality of input lines connected to the output lines of the counter for receiving said combination or set of binary output signals from said counter. The decoder also has a plurality of output lines and provides a single output signal on a separate and specific line for each combination or set of binary signals received. An electronic ROM (Read Only Memory), having a plurality of input lines for receiving the output signal from the decoder is also provided. Said ROM is capable of providing as many separate and specific pre-programmed multibit codes as there are input lines to said ROM. These multibit codes which contain the identification information requested by the central computer are transmitted back to the computer.

Additional objects, features and advantages of the present invention will become apparent to those skilled in the art from the following detailed description and attached drawings, on which, by way of example, a preferred embodiment of the invention is illustrated.

DETAILED DESCRIPTION OF THE INVENTION

Figure 1:
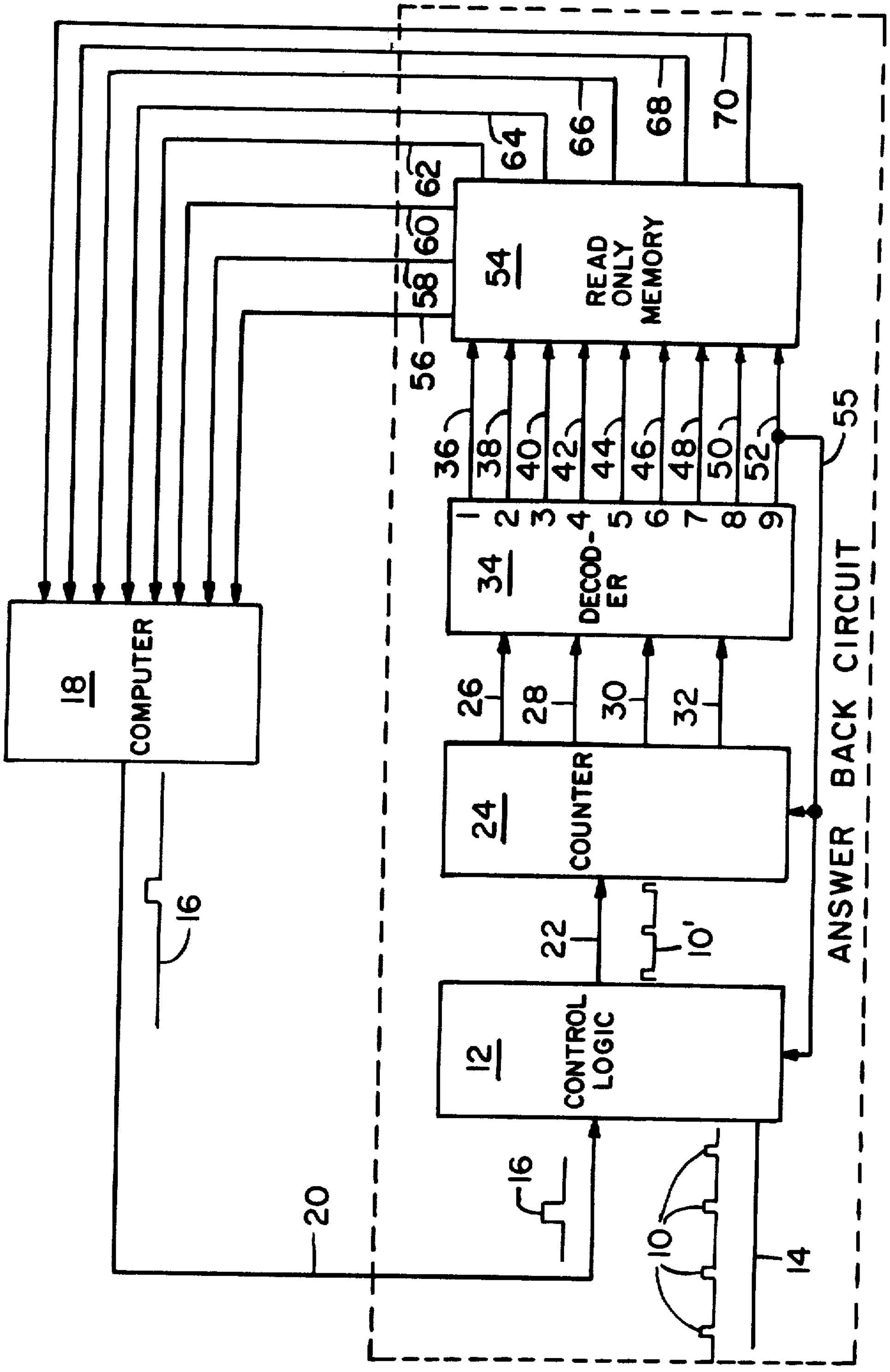
FIG. 1 is a signal flow and block diagram illustrating the direction of signals between circuit components of the present invention.

When information from a central computer is desired by a remote terminal, an addressing signal will be sent to the central computer by the remote terminal. Upon receiving the addressing signal, the central computer will send back to the remote terminal a signal which is commonly called a WRU (Who Are You) signal. When the remote terminal is requested to identify itself by such a WRU signal, identification information must be sent back to the computer in an exact sequence of coded signals before a fixed time period expires, or the computer will not process further information from the terminal. Referring now to FIG. 1 there is illustrated a signal flow and block diagram of a digital answerback circuit built in accordance with the present invention. Clock pulses 10 (source not shown) are supplied to control logic circuit 12 by input line 14. Control logic circuit 12 controls clock pulses 10 such that they do not proceed past control logic circuit 12 until a WRU signal 16, normally originated by the central computer 18, is received at control logic circuit 12 on line 20. When WRU signal 16 is received at control logic circuit 12, it enables clock pulses to leave the control logic circuit on line 22. When used hereinafter, the term "clockpulse" means the actual clock pulses received, or a pulse generated by the control logic circuitry corresponding in phase and frequency to the received clock pulses. The clock pulses leaving said control logic circuit being designated as 10'.

Clock pulses 10' are then applied by line 22 to electronic counter circuitry 24 which counts said pulses. Counter circuitry 24 produces a combination or set of binary output signals as each clock pulse is received, which combination or set of binary signals corresponds to a count of the number of clock pulses received. In the embodiment illustrated in FIG. 1, the binary output is on four lines 26, 28, 30 and 32. However, additional or fewer lines for the binary output signals may be used as necessary. The number of output lines used being dependent upon the maximum number of pulses to be counted by the counter.

The combination or set of signals representing a binary count of the number of clock pulses received is applied by lines 26–32 to decoder circuitry 34. Decoder circuitry 34 has a separate and specific output line for each clock pulse counted by said counter. The embodiment illustrated in FIG. 1 has 9 output lines designated by even numbers from 36 through 52. Therefore, as the binary count is received by decoder circuitry 34 said circuitry produces an output signal on one of said separate and specific lines 36 through 52 which corresponds to the specific count received. For example, in the circuit in FIG. 1, if the binary input to the decoder circuitry represents a decimal count of 1, said decoder will send out a signal on line 36 representing the decimal count of 1. Then, as the binary input progresses to the decimal equivalent of 2, the decoder will stop sending out a signal on line 36 representing 1, and will start sending out a signal on line 38 which represents the decimal count of 2. Thus, for each clock pulse received by the counter there is a binary output from said counter which is received by the decoder as an input, and as said binary output progresses sequentially through each number, the single output signal from the decoder changes to a separate and specific line representing the number of clock pulses counted. The decoder output signal is then applied by one of the lines 36 through 52 to ROM (Read Only Memory) 54, hereinafter described. When the number of clock pulses received is equivalent to the maximum number of pulses capable of being counted by the answerback circuit, the output signal from the decoder on the specific line representing that maximum number in addition to being sent to ROM 54, may also be applied to logic circuitry 12 by means of line 55 to reset the answerback circuitry and to prevent other pulses from being received by counter circuitry 24. The same signal may also be applied directly to counter circuitry 24 to reset the count of said counter circuitry to zero. For example, FIG. 1 illustrates that on the 9th pulse, line 52 transmits a signal directly to ROM 54, and through line 55, to counter 24, and control logic circuit 12.

ROM 54 receives the output signals from decoder 34, and for each different input received a preprogrammed multibit code is sent back to the computer from the ROM. In the embodiment illustrated in FIG. 1, an 8-bit code is sent back to computer 18 on even numbered lines 56 through 70.

Parameters, such as frequency and duty cycle, of the clock pulses used by the present invention may be readily varied within limitations without causing any change in operation or deleterious effects. It is necessary, however, that the frequency of the clock pulse be high enough so that the required sequence of coded signals can be returned to the computer within the allowed time. It is also necessary that the frequency be low enough and that the pulse duration (duty cycle) be sufficiently long to allow the circuit components to react. For purposes of comparison, remote terminals using mechanical answerback systems require a minimum time of around 1–2 seconds to provide 18 different 8-bit codes, whereas digital answerback circuit built in accordance with the following described preferred embodiment can readily provide 18 different 8-bit codes in less than 0.5 millisecond.

PREFERRED EMBODIMENT

Figure 2:
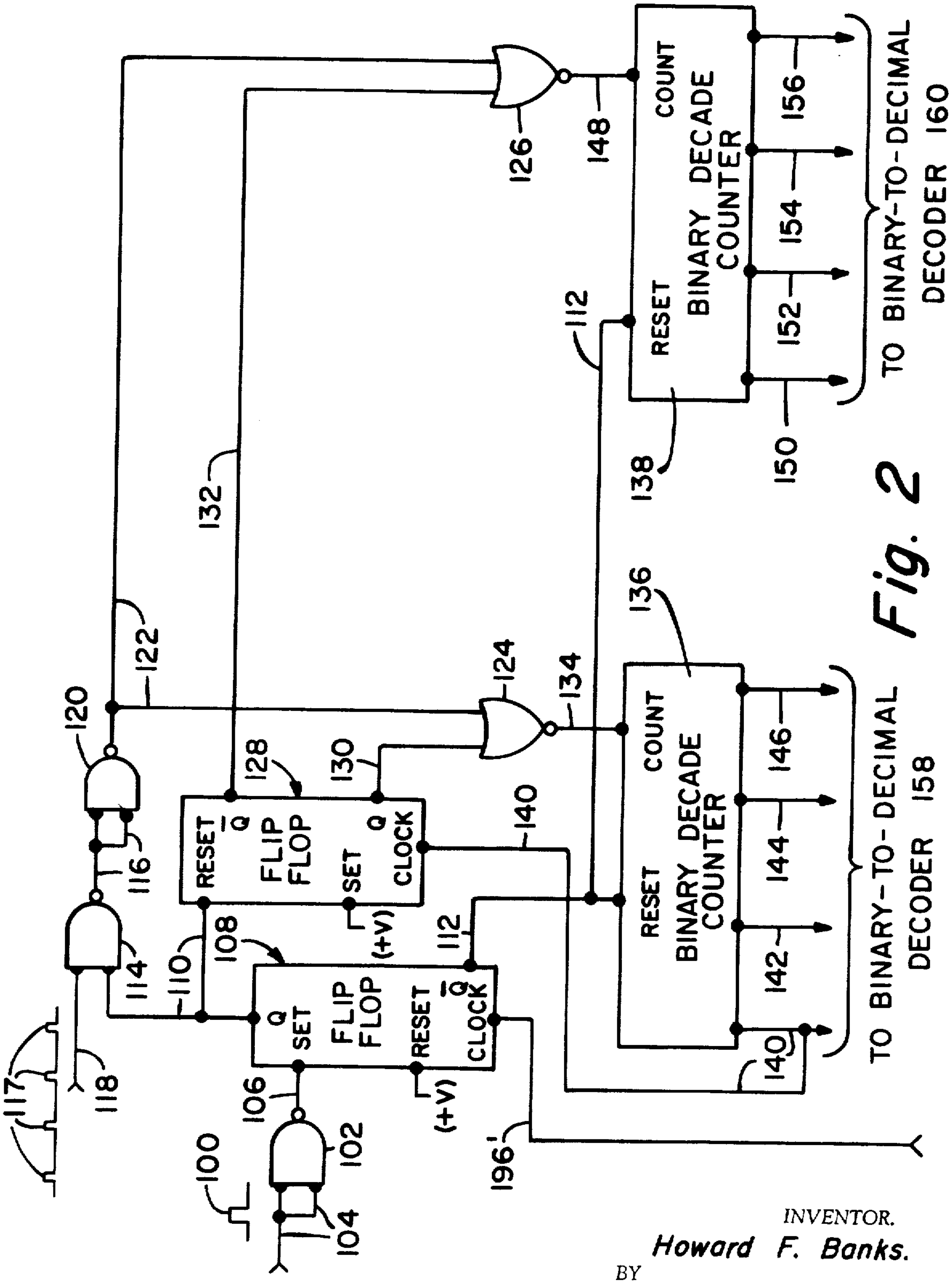
FIGS. 2 and 3 are a combination block and logic diagram of a preferred embodiment of a digital answerback circuit built according to the teachings of the present invention.
Figure 3:
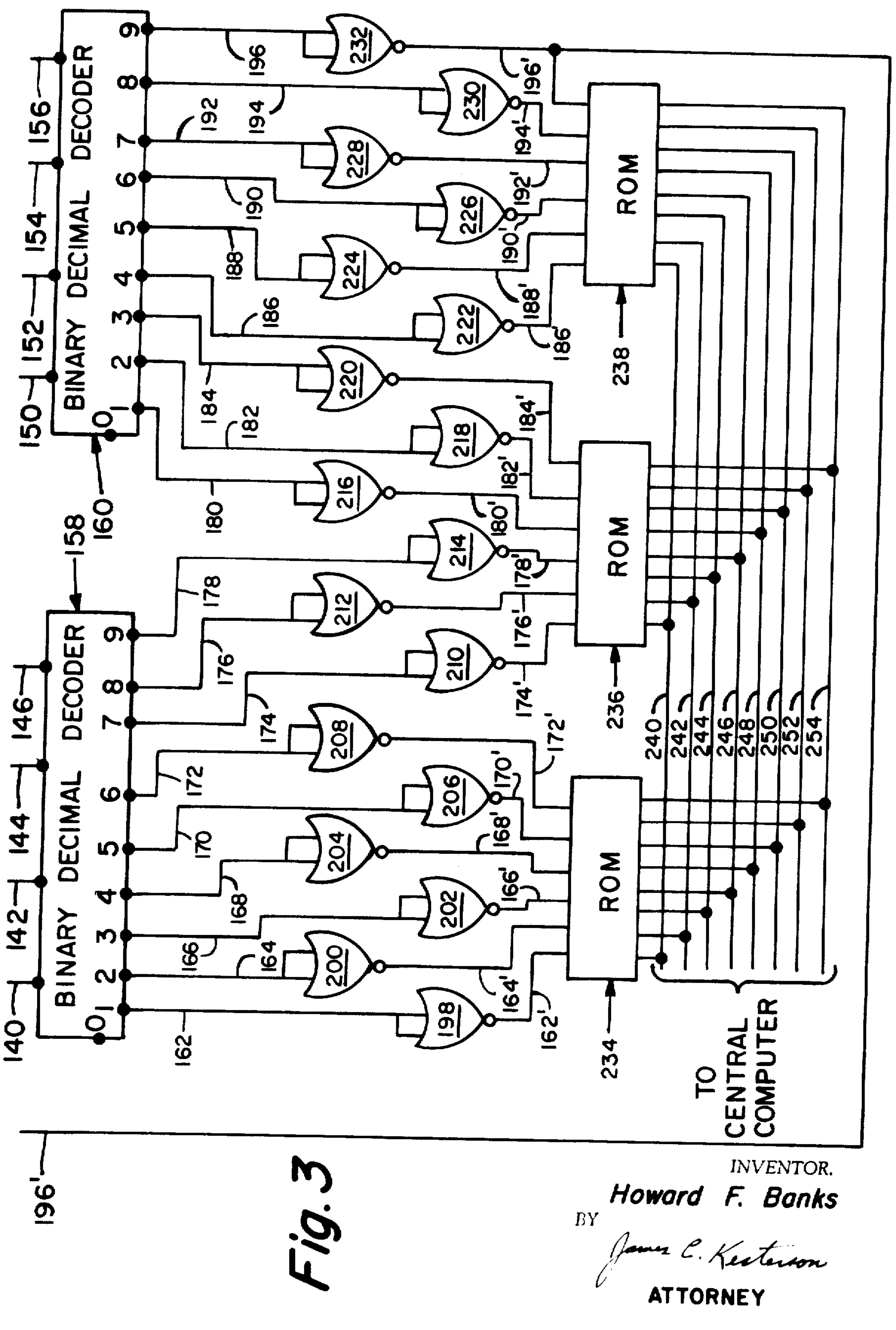

FIGS. 2 and 3 illustrate a combination block and logic diagram of a preferred embodiment of a digital answerback circuitry according to the present invention. The diagram as shown illustrates a digital answerback circuitry that can send 18 different 8-bit codes back to the computer to supply required information. The code could, of course, be made up of as many bits or elements as is required by the using apparatus. In most computer applications, however, an 8-bit code is required. If there is need for additional information, additional multibit codes can be made available by increasing the number of counters and decoders, and the size of the ROM.

In describing the following preferred embodiment of this invention, standard logic signs of "1" and "0" are used to indicate high and low signals (sometimes referred to as on and off respectively). The following described embodiment also uses "NAND gates" and "NOR gates" for accomplishing logic functions and to invert signals, however, it is recognized that any one skilled in the art could easily substitute either wholly or in part combinations of "AND gates" and "OR gates" to accomplish equivalent functions. Furthermore, in the embodiment described, the "flip-flops," "binary decode counter," and "binary to decimal decoders" are initiated or triggered on the falling edge of a "1" signal. For example, a "1" signal is required to cause a condition change in these components, however, the condition change will not occur when the signal is first applied, but occurs only when the signal is removed, that is, on the falling edge. This type of triggering or initiation of action of the components used by this preferred embodiment is not universal, as flip-flops, counters, and decoders which operate on the leading edge of a "1" signal are commercially available and can readily be used by one skilled in the art by making very minor modifications to the circuitry. Circuit modifications and variations necessary because of the use of different types of components are considered and intended to be within the scope of this invention.

Figure 4:
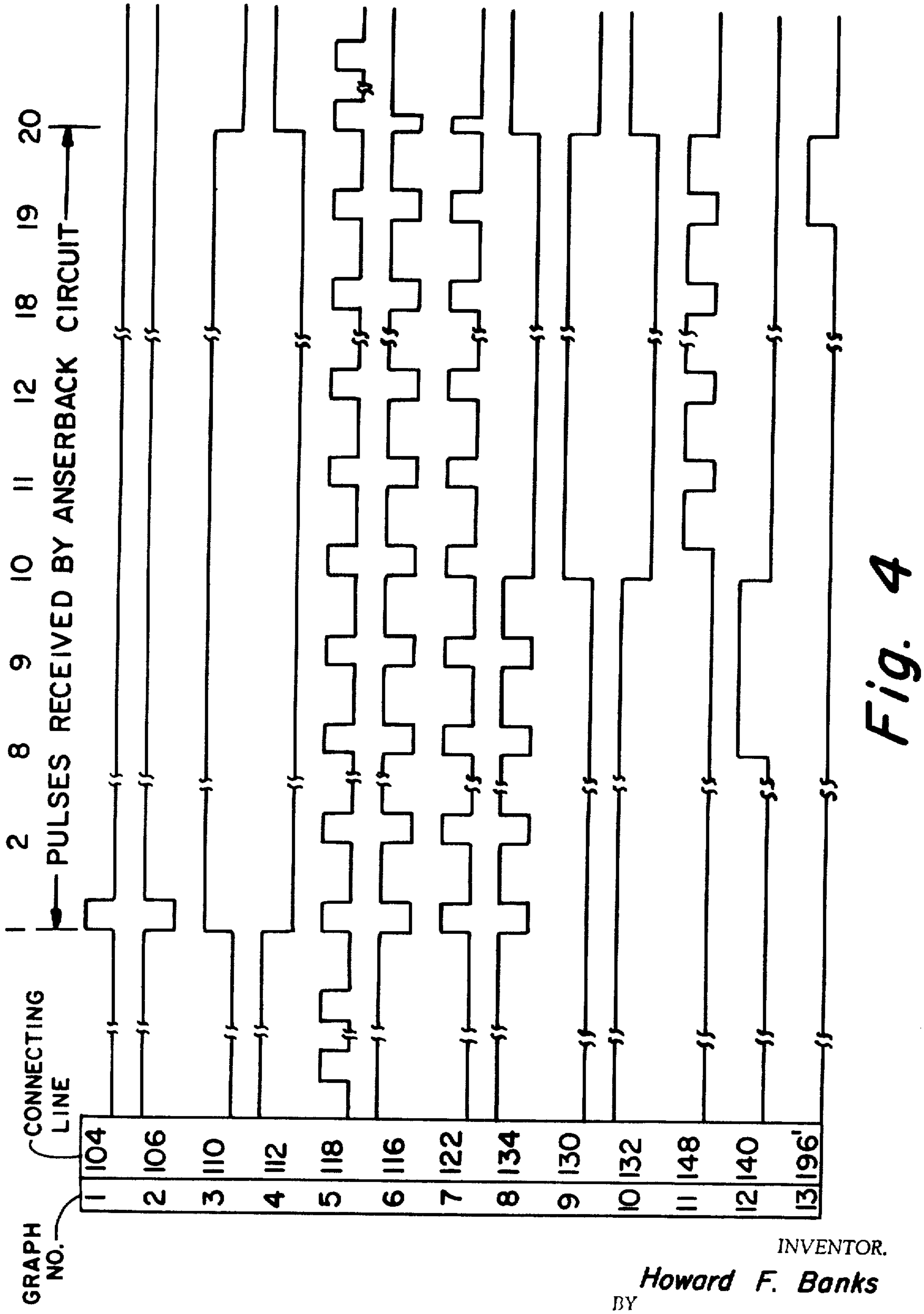
FIG. 4 is a chart of the signal output level of selected components of the answerback circuit of FIGS. 2 and 3.

The chart in FIG. 4 illustrates the signal level on different connecting lines of the answerback circuit illustrated in FIGS. 2 and 3 as time progresses from an initial period of time just prior to receiving a WRU signal up until the system resets itself to await a new WRU signal. Table I shows the signal output conditions of all of the circuit components of the answerback circuit illustrated in FIGS. 2 and 3 prior to the WRU signal being received.

TABLE I

| Component | Output Line(s) | Output condition immediately Prior to the circuit receiving a WRU "1" Signal |
|---|---|---|
| NAND Gate 102 | 106 | "1" |
| Flip-flop 108 | | |
| Q output | 110 | "0" |
| Q output | 112 | "1" |
| NAND Gate 114 | 116 | "1" |
| NAND Gate 120 | 122 | "0" |
| NOR Gate 124 | 134 | "1" |
| NOR Gate 126 | 148 | "0" |
| Flip-flop 128 | | |
| Q output | 130 | "0" |
| Q output | 132 | "1" |
| Counter 136 | 140–146 | "0" |
| Counter 138 | 150–156 | "0" |
| Decoder 158 | 162–178 | "1" (represents the decimal counts of 1–9) (the "0" on the unused output represents a decimal 0) |
| Decoder 160 | 180–196 | "1" (represents the decimal counts of 1–9) (the "0" on the unused output represents a decimal 0) |
| NOR Gates 198–232 | 162'–196' | "0" |
| ROM section 234 | 240–254 | "0" |
| ROM section 236 | 240–254 | "0" |
| ROM section 238 | 240–254 | "0" |

Referring now to FIGS. 2 and 3, a WRU "1" signal 100 from a central computer (not shown) is received by 2-input NAND gate 102 on both input lines 104. Prior to receiving the WRU signal, the output on line 106 of NAND gate 102 is a "1," but is changed to a "0" when said WRU signal is applied to said NAND gate; see Table I and graphs 1 and 2 of FIG. 4. Therefore, a "1" signal is continually applied to the "set" input of flip-flop 108 by line 106 until the WRU "1" signal input is received at NAND gate 102.

The two flip-flops used in this embodiment are identical and each has two output signals designated as Q and $\overline{Q}$ which signals from each flip-flop are always out of phase. That is, when the Q output signal is a "1" the $\overline{Q}$ output signal will be a "0," and when the Q output signal is a "0," the $\overline{Q}$ output signal will be a "1." These flip-flops also have three input signals. These input signals are (1) a "set" signal, (2) a "reset" signal, and (3) a "clock" signal. When the "set" signal is received, the Q and $\overline{Q}$ output signals will be driven to the predetermined conditions of Q = "1" and $\overline{Q}$ = "0," and when a "reset" signal is received the Q and $\overline{Q}$ outputs will be driven to the opposite predetermined conditions of Q = "0" and $\overline{Q}$ = "1." Receiving a " clock" input, however, does not drive the Q and Q outputs to a specific predetermined condition, but instead will reverse the output signals regardless of their output condition prior to receipt of the "clock" input. That is, if the output signals are Q = "0" and $\overline{Q}$ = "1," receipt of a "clock" input will change the output to Q = "1" and $\overline{Q}$ = "O," but if the output signals are already Q = "1" and $\overline{Q}$ = "O" receipt of a "clock" input will change the outputs to Q = "0" and $\overline{Q}$ = "1." If one of the flip-flop inputs is not used, it is desirable to connect the unused input to a constant "1" or positive voltage sources so that stray or spurous signals will not result in an output condition changes For example, the "reset" input of flip-flop 108 is not used in this embodiment, and is connected to a positive voltage source.

Referring again to FIGS. 2 and 3, when WRU signal 100 is received at NAND gate 102, the "1" signal on line 106 from said NAND gate 102 falls off to a "0." Therefore, the falling edge of said "1" signal on line 106 received at the "set" input of flip-flop 108 drives the outputs of said flip-flop to the predetermined conditions of Q = "1" on line 110, and $\overline{Q}$ = "0" on line 112. Graphs 2, 3 and 4 of FIG. 4 illustrate this change. Prior to the condition change initiated by the "set" signal, the outputs of flip-flop 108 were Q = "0" and $\overline{Q}$ = "1" (see Table I). When the $\overline{Q}$ output signal on line 112 switches from a "1" to a "0," the falling edge of the "1" signal is applied to the "reset" input of two electronic binary counters, and causes said counters to be reset so as to produce a zero output if they are otherwise. The binary counters will be discussed more fully hereinafter. Prior to said WRU signal 100, 2-input NAND gate 114 was receiving a Q = "0" signal on line 110 from flip-flop 108 which resulted in a continuous "1" output on line 116 from said NAND gate since the output of a NAND gate is always "1" if any of the inputs are "0." However, when the Q output from flip-flop 108 transmitted by line 110 switches from a "0" to a "1," the output of NAND gate 114 will begin switching back and forth between "1" and "0" as the second input to NAND gate 114 switches between "0" and "1." The second input to NAND gate 114 is a continuous series of clock pulses 117 supplied by line 118 from a pulse source not shown. The output of NAND gate 114, however, is 180° out of phase with clock pulses 117 when the Q output from flip-flop 108 is "1." That is, when the clock pulse is a "1" the NAND gate output is a "O," and when the clock pulse is a "0" the NAND gate output is a "1." Graphs 5 and 6 of FIG. 4 illustrate this phase relationship. The pulsing signal from NAND gate 114 is applied by line 116 to both inputs of 2-input NAND gate 120. Prior to receiving said pulsing signal from NAND gate 114, NAND gate 120 was constantly supplying a "0" signal at its output on line 122 because of the two continuous "1" inputs from NAND gate 114. When both inputs to a 2-input NAND gate are "1" the output is "0." However, when the output of NAND gate 114 starts changing between "0" and "1" in response to clock pulses 117, NAND gate 120 inverts this pulsing signal and emits a pulsing output signal that is 180° out of phase with the signal produced by NAND gate 114 in phase with clock pulses 117. See Table I and Graphs 5, 6 and 7 of FIG. 4 for an illustration of this phase relationship. The pulsing output signal of NAND gate 120 is then applied by lines 122 to NOR gates 124 and 126. NOR gates 124 and 126 are both 2-input NOR gates and line 122 is connected to one of the inputs of each. The second input of NOR gate 124 is received from the Q output of flip-flop 128 on line 130, and the second input of NOR gate 126, to be further discussed hereinafter, is received from the $\overline{Q}$ output of flip-flop 128 on line 132. As shown in Table I, the outputs of flip-flop 128 prior to a WRU signal being received by the answerback circuit are: Q = "0" on line 130, and $\overline{Q}$ = "1" on line 132. Therefore, NOR gate 124 initially has a "1" output on line 134 since its input from both NAND gate 120 and flip-flop 128 are "0's," which output will continue to be a "1" until one of the inputs changes to a "1."

As was explained above, the output of NAND gate 120 which supplies one of the two inputs to NOR gate 124 becomes a pulsing signal after the WRU signal is received by the answerback circuit, and said pulsing signal is in phase with clock pulses 117. Therefore, as the clock pulse changes from a "0" to a "1," the output of NAND gate 120 on line 122 will also change from a "0" to a "1," while the output of NOR gate 124 on line 134 will change from a "1" to a "0." This is illustrated by Table I, Graphs 7 and 8 of FIG. 4. The "1" signal applied to binary counter 136 on line 134 will change to a "0" signal, that is, after the WRU signal, the counter will see a falling edge at substantially the same time the leading edge of a first clock pulse is received by the answerback circuit. When the clock pulse returns to a "0" position, the output of NOR gate 124 returns to a "1" condition, and thereafter as each leading edge of a clock pulse is applied to the answerback circuit the falling edge of a "1" signal is received by the binary counter. Therefore, the counter will change its count at substantially the same time the leading edge of each clock pulse is received by the answerback circuit, since as explained earlier, the type of counter used in this described preferred embodiment operates on the falling edge of an applied signal.

Counter 138 is identical to counter 136, and therefore, the following operational discussion is applicable to both counters unless otherwise noted. These counters are both binary decade counters, that is, the combination or set of signal outputs of said counters is in binary form, and said counters count pulses from 0–9 and then recycle to 0 on the 10th pulse. As shown in FIG. 2, the binary output of counter 136, which corresponds to the number of pulses received, is on four lines labelled 140, 142, 144, and 146 since in this embodiment the counter must count between 0 and 9, and since at least four digits are required to display the equivalent of any decimal number between 8 and 15 in binary form. Although the binary equivalent of decimal numbers 0–9 is well known to persons skilled in the art, the operation of this described embodiment of the invention becomes somewhat involved and complicated at the eighth, ninth and 10th pulses. Therefore, for convenience, Table II is set out showing the binary-to-decimal equivalents between 0 and 9, and in addition further illustrates the conditions on each output line 140, 142, 144, and 146 for the respective decimal count.

Table II

| Decimal Count | Four Digit Binary Equivalent | Output Condition on Lines 140 | 142 | | 146 |
|---|---|---|---|---|---|
| 0 | 0000 | "0" | "0" | "0" | "0" |
| 1 | 0001 | "0" | "0" | "0" | "1" |
| 2 | 0010 | "0" | "0" | "1" | "0" |
| 3 | 0011 | "0" | "0" | "1" | "1" |
| 4 | 0100 | "0" | "1" | "0" | "0" |
| 5 | 0101 | "0" | "1" | "0" | "1" |
| 6 | 0110 | "0" | "1" | "1" | "0" |
| 7 | 0111 | "0" | "1" | "1" | "1" |
| 8 | 1000 | "1" | "0" | "0" | "0" |
| 9 | 1001 | "1" | "0" | "0" | "1" |
| 0 | 0000 | "0" | "0" | "0" | "0" |

When clock pulse 8 is received at counter 136, the binary output on lines 140, 142, 144 and 146 is "1," "0," "0," "0," respectively. A "1" signal on output line 140 of counter 136 in addition to being applied to a binary-to-decimal decoder, hereinafter described, is also applied to the "clock" input of flip-flop 128. However, flip-flop 128 operates on the falling edge of a "1" signal applied to said "clock" input and there is no change in the output condition of flip-flop 128 at this time. The "1" signal on line 140 from counter 136 which first appeared at the count of 8 remains on line 140 during clock pulse 8, during the time period between clock pulses 8 and 9, during clock pulse 9, and during the time period between clock pulses 9 and 10, so that the clock input still does not cause a change in the condition of the flip-flop output. However, when clock pulse 10 is received, counter 136 recycles to a binary output of "0000," which represents a decimal zero. As the signal on line 140 is changing from a "1" to a "0" the falling edge of this changing signal is applied to the "-clock" input of flip-flop 128 causing said flip-flop to change state. That is, output Q of flip-flop 128 on line 130 changes from a "0" to a "1," and output $\overline{Q}$ on line 132 changes from a "1" to a "0." Since said Q output is applied to NOR gate 124, changing Q from a "0" to a "1" results in a continuous "0" output on line 134 from NOR gate 124, and, therefore, no further pulsing signals will reach counter 136. Changing the $\overline{Q}$ output applied to NOR gate 126 by line 132 from a "1" to a "0" results in a pulsing output from NOR gate 126 rather than the continuous "0" output as was the condition before $\overline{Q}$ changed state. See graphs 8, 9, 10, 11 and 12 of FIG. 4 for an illustration of these changes and conditions. The pulsing output from NOR gate 126 is applied to counter 138 by line 148. The clock pulses 117 received by the answerback circuit on line 118 are of substantially longer duration than the time required for switching the logic components, therefore, a "1" signal on line 122 representing the 10th clock pulse which resulted in counter 136 being recycled back to "0000" is still present at NOR gate 126 when the $\overline{Q}$ output of flip-flop 128, transmitted by line 132 goes to "0." Therefore, since the output of a NOR gate is always "0" unless all inputs are "0," receipt by NOR gate 126 of the signal $\overline{Q}$ = "0" will not result in any change in the output of NOR gate 126 at this time. Consequently, in this embodiment, the tenth clock pulse does not result in an output from either counter 136 or 138. However, when the tenth clock pulse switches from "1" to "0," the signal output from NAND gate 120 on line 122 also switches from a "1" to a "0" such that all inputs to NOR gate 126 are "0." Therefore, the output of NOR gate 126 will change to a "1" so that when the leading edge of the eleventh pulse arrives at the answerback circuit the falling edge of a signal is applied to counter 138. See graphs 7, 8, 9, 10 and 11 of FIG. 4. This being the first falling edge seen by counter 138, said counter will supply a binary output of "0," "0," "0," "1" on lines 150, 152, 154 and 156 respectively. Each succeeding clock pulse applied to the answerback circuit results in the falling edge of a signal being applied to counter 138, such that said counter provides a binary output which progresses sequentially up to the decimal equivalent of 9. The effect of the change of flip-flop 128, therefore, is that after the first nine clock pulses (1–9) are received at counter 136, the tenth pulse is not used, and then a second nine clock pulses (11–19) are received at counter 138. Thus, the binary outputs from counter 136 represent clock pulses 1–9, while the binary outputs of counter 138 represent clock pulses 11–19 and clock pulse 10 is not represented by a binary output. As will be explained in more detail hereinafter, the 19th clock pulse further results in the complete answerback circuit being reset so that no further clock pulses can be received at either counter 136 or 138 until another WRU signal is received.

Binary outputs from counters 136 and 138 are applied directly to electronic binary-to-decimal decoders 158 and 160, respectively. These decoders are identical in operation and, therefore, the following discussion is applicable to each unless otherwise noted. Decoders 158 and 160 have four input lines to receive the binary inputs from the counters, and 10 output lines for providing a signal on a separate and specific line for the binary input received. Lines 162–178 are connected to the outputs of decoder 158 and lines 180–196 are connected to the outputs of decoder 160. The output of decoders 158 and 160 which represent a decimal input of zero are not used and therefore there are no lines connected to these outputs. When a binary input is applied to the decoder, the signal on the output line which corresponds to the applied binary input changes from a "1" to a "0." That is, a "1" is always present on a specific decoder output line unless a binary input corresponding to that specific line is present. Table III as set out below better illustrates this operation, for decoder 158.

TABLE III

| Decimal Number | Four Digit Binary Input | Signal level on Output lines 162 | 164 | 166 | 168 | 170 | 172 | 174 | 176 | 178 |
|---|---|---|---|---|---|---|---|---|---|---|
| 0 | 0000 | "1" | "1" | "1" | "1" | "1" | "1" | "1" | "1" | "1" |
| 1 | 0001 | "0" | "1" | "1" | "1" | | "1" | "1" | "1" | "1" |
| 2 | 0010 | "1" | "0" | "1" | "1" | "1" | "1" | "1" | "1" | "1" |
| 3 | 0011 | "1" | "1" | "0" | ""1" | "1" | "1" | "1" | "1" | "1" |
| 4 | 0100 | "1" | "1" | "1" | "0" | "1" | "1" | "1" | "1" | "1" |
| 5 | 0101 | "1" | "1" | "1" | "1" | "0" | "1" | "1" | "1" | "1" |
| 6 | 0110 | "1" | "1" | "1" | "1" | "1" | "0" | "1" | "1" | "1" |
| 7 | 0111 | "1" | "1" | "1" | "1" | "1" | "1" | "0" | "1" | "1" |
| 8 | 1000 | "1" | "1" | "1" | "1" | "1" | "1" | "1" | "0" | "1" |
| 9 | 1001 | "1" | "1" | "1" | "1" | "1" | "1" | "1" | "1" | "0" |

For example, with a binary input of "0," "0," "0," "1" on lines 140, 142, 144, and 146 respectively, output number 1 of decoder 158, connected to line 162, goes to a "0." This "0" output is applied by line 162 to both inputs of 2-input NOR gate 198 where said applied signal is inverted from a "0" to a "1." As shown in Table I, the output condition of NOR gates 198–232 prior to the WRU signal is "0." NOR gates 200–214 are connected to the remaining 8 inputs of decoder 158 by lines 164–178, and NOR gates 216–232 are connected to outputs 1-9 of decoder 160 by lines 180–196. Therefore, as a "0" signal appears on a decoder output line, said "0" signal is inverted by a NOR gate so that a "1" signal is applied to one of the three ROM (Read Only Memory) sections 234, 236 or 238 to be discussed hereinafter. The output lines of said NOR gates 198–232 are designated as 162′–196′ respectively.

The six outputs of decoder 158, on lines 162–172, which represents six clock pulses 1–6 are inverted by NOR gates 198–208 and applied to said first ROM section 234 by lines 162′–172′. The three outputs 7–9 of decoder 158 and the three outputs 1–3 of decoder 160 on lines 174–184, representing the six clock pulses 7, 8, 9, 11, 12 and 13, clock pulse 10 not being counted, are inverted by NOR gates 210–220 and are applied to a second ROM section 236 by lines 174′–184′. The six outputs 4–9 of decoder 160 on lines 186–196, representing the six clock pulses 14–19, are inverted by NOR gates 222–232 and are applied to a third ROM section 238 by lines 186′–196′. After the output of decoder 160 corresponding to the 19 th clock pulse is inverted by NOR gate 232, it is fed to the third ROM section 238, and in addition is also fed to the "clock" input of flip-flop 108 by line 196′. Therefore, on the leading edge of the 19th pulse a "1" signal is transmitted to the "clock" input of flip-flop 108. Since flip-flop 108 operates on a falling edge, this signal does not cause any change in said flip-flop at this time. However, when the twentieth pulse is received by the answerback circuit, decade counter 138 recycles and produces a binary output of "0," "0," "0," "0." Therefore, the output on line 196 returns to a "1," and the output from NOR gate 232 on line 196′ returns to a "0." As the output signal of NOR gate 232 switches from a "1" to a "0," the "clock" input of flip-flop 108 sees a falling edge resulting in a change in the Q and $\bar{Q}$ outputs of flip-flop 108. That is, the Q output is changed from a "1" to a "0" and $\bar{Q}$ is changed from a "0" to a "1". The change of Q from a "1" to a "0" has the effect of preventing any further pulsing output signals from leaving NAND gate 114, and also resets flip-flop 128 such that the Q output of flip-flop 128 switches from a "1" to a "0," and the $\bar{Q}$ output of flip-flop 128 switches from a "0" to a "1." The change of $\bar{Q}$ of flip-flop 108 from a "0" to a "1" applies a "1" "reset" signal to both counters such that when a subsequent WRU signal again changes flip-flop 108, said "1" "reset" signal to the counters is removed, and the falling edge will drive the binary output of both counters to "0," "0," "0," "0" if they are otherwise.

Figure 5:
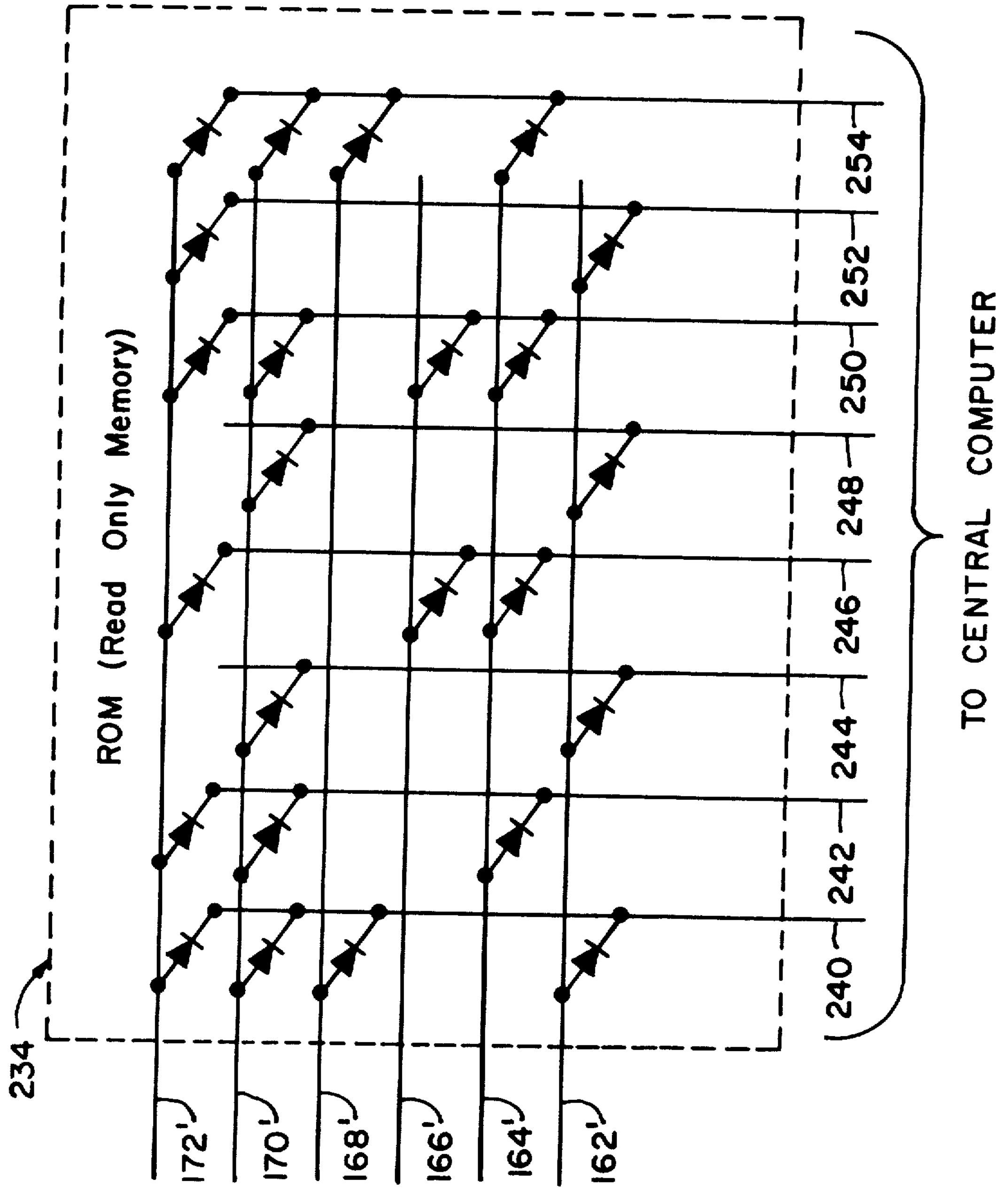
FIG. 5 is a schematic diagram of a diode matrix type ROM device used in the digital answerback circuit of FIGS. 2 and 3.

As each signal representing clock pulses 1–9 and 11–19 occurs in sequence at the three sections of said ROM, the code preprogrammed in said ROM for that input appears at the ROM output on lines 240–254 by which they are transmitted to the central computer. Each section of the ROM is comprised of a 6 × 8 diode matrix. The electrical schematic of a typical diode arrangement which could be used in section 234 is shown in FIG. 5. Sections 236 and 238 operate in the same manner and differ only by diode connections.

Referring now to FIG. 5, receipt of a "1" input signal on line 162′ from NOR gate 198 results in a 8-bit code output of "1," "0," "1," "0," "1," "0," "1," "0" on lines 240–254 respectively.

Table IV shows the 8-bit code output on lines 240–254 which results from an input signal received on one of the input lines 162′–172′. Furthermore, the output code for any particular input can easily be changed by simply adding or removing a diode between the input line and the desired output line.

TABLE IV

| "1" On Input Line | 240 | Resulting Signals 242 | 244 | 246 | 248 | 250 | on Output Lines 252 | 254 |
|---|---|---|---|---|---|---|---|---|
| 162′ | "1" | "0" | "1" | "0" | "1" | "0" | "1" | "0" |
| 164′ | "0" | "1" | "0" | "1" | "0" | "1" | "0" | "1" |
| 166′ | "0" | "0" | "0" | "1" | "0" | "1" | "0" | "0" |
| 168′ | "1" | "0" | "0" | "0" | "0" | "0" | "0" | "1" |
| 170′ | "1" | "1" | "1" | "0" | "1" | "1" | "0" | "1" |
| 172′ | "1" | "1" | "0" | "1" | "0" | "1" | "1" | "1" |

A specific example of an answerback circuit which is in accordance with the teaching of the previously described preferred embodiment of the present invention follows. The following list of components are connected in the same manner as that illustrated in FIGS. 2 and 3 and function in the same manner as the components described in connection therewith.

List of Components for Specific Examples

| Component | Manufacturer and Part No. |
|---|---|
| NAND gates 102, 114, 120 | Signetics—SP680A |
| Flip-Flops 108, 128 | Signetics—LU322A |
| BCD Decade Counters 136, 138 | Texas Instrument—SN7490N |
| NOR gates 124, 126, and 198–232 | Signetics—LU380A |
| ROM section 234, 236, 238 | Radiation Incorporated—RM 144 |
| Decoder 158, 160 | Texas Instrument—SN7442N |

Although the present invention has been described with respect to a preferred embodiment, it is not intended that such a preferred embodiment be a limitation on the scope of this invention except insofar as is set forth in the following claims.

I claim:

1. An apparatus for providing a signal comprising means for providing clock pulses, counter means having at least one input connected to said means for providing clock pulses, and a plurality of outputs for providing a set of binary signals representing clock pulses received and counted by said counter means, decoder means having a plurality of inputs connected to said outputs of said counter means for receiving said set of binary signals from said counter means, and a plurality of outputs for providing an output signal corresponding to each set of binary signals received, and read only memory means having a plurality of inputs connected to said outputs of said decoder means for receiving said output signal from said decoder means, and a plurality of outputs for providing a coded signal.

2. The apparatus of claim 1 further comprising utilizing means connected to said outputs of said read only memory means.

3. The apparatus of claim 1 wherein said means for providing clock pulses comprises a source of clock pulses, and control logic circuitry for controlling clock pulses transmitted between said source and said counter means.

4. The apparatus of claim 3 further comprising connecting means between said control logic circuitry and one of the outputs of said decoder means.

5. The apparatus of claim 3 further comprising connecting means between said counter means and one of the outputs of said decoder means.

6. The apparatus of claim 5 further comprising connecting means between said control logic circuitry and one of the outputs of said decoder means.

7. The apparatus of claim 3 further comprising an external source of signals wherein said control logic circuitry comprises means for receiving a signal from said external source, and means responsive to said signal from said external source for applying said clock pulses to one input of said at least one input of said counter means.

8. The apparatus of claim 1 wherein said counter means comprises a binary counter.

9. The apparatus of claim 1 wherein said decoder means comprises at least one binary-to-decimal decoder.

10. The apparatus of claim 1 wherein said read only memory means comprises a diode matrix.

11. A circuit for providing a identification information from a remote terminal to a central computer comprising means for providing clock pulses, first and second binary decade counters, each having first and second inputs and at least four outputs, said first inputs being connected to said means for providing clock pulses, said at least four outputs of each counter providing a set of binary signals representing the number of clock pulses received by said counters, first and second binary-to-decimal decoders each having at least four inputs and at least nine outputs, said inputs of said decoders being connected to said outputs of said counters for receiving said binary signals from said counters, said outputs of said decoder for providing an output signal for each set of binary signals received by said decoder, and a diode matrix having at least 18 inputs, and at least eight outputs, said 18 inputs receiving a signal corresponding to said output signal from said decoder, said eight outputs of said diode matrix providing a coded signal to said central computer.

12. The circuit of claim 11 wherein said 18 inputs of said diode matrix is connected directly to said outputs of said decoders.

13. The circuit of claim 11 wherein said means comprises a source of clock pulses, and control logic circuitry, said control logic circuitry being connected between said source and said first inputs of said first and second counters for controlling clock pulses transmitted between said source and said counters.

14. The circuit of claim 13 wherein said control logic circuitry comprises means for receiving a signal from said central computer and means responsive to said signal from said central computer for applying said clock pulses to said first inputs of said counter.

15. The circuit of claim 13 further comprising connecting means between said control logic circuitry and one of said decoder outputs.

16. The circuit of claim 13 further comprising connecting means between said control logic circuitry and said second inputs of said counters.

17. The circuit of claim 13 further comprising connecting means between said control logic circuitry and one of said four outputs of said first counter.

18. The circuit of claim 13 further comprising at least 18 2-input NOR gates, both inputs of each NOR gate being connected to a single and separate output of said decoder, the output of each NOR gate being connected to a single and separate input of said diode matrix.

19. The circuit of claim 18 wherein said control logic circuitry comprises a first 2-input NAND gate for gating said clock pulses, the first input being connected to said source of clock pulses, a second 2-input NAND gate, both of said inputs being connected to the output of said first 2-input NAND gate, a third 2-input NAND gate for receiving and inverting a signal from said central computer, said signal from said central computer being received on both inputs of said third NAND gate, a first flip-flop having a first and second input and first and second outputs, said outputs being 180° out of phase with each other, said first input being connected to one of the outputs from one of said binary decade counters, a second flip-flop having a first and second input and first and second outputs, said outputs being 180° out of phase with each other, said first input being connected to the output of said third NAND gate, said second input being connected to the output of one of said eighteen NOR gates, said first output being connected to said second inputs of said first and second binary decade counters, said second output being connected to the second input of said first flip-flop and to the second input of said first 2-input NAND gate, and a first and second 2-input NOR gate, one input of each of said NOR gates being connected to the output of said second NAND gate, the second input of said first NOR gate being connected to the first output of said first flip-flop, the second input of said second NOR gate being connected to the second output of said first flip-flop, the output of said first nOR gate being connected to said first input of said first binary decade counter, the output of said second NOR gate being connected to the first input of said second binary decade counter.

20. The circuit of claim 19 wherein said diode matrix comprises three 6 by 8 sections.

* * * * *

PO-1050
(5/69)

UNITED STATES PATENT OFFICE
CERTIFICATE OF CORRECTION

Patent No. 3,697,961 Dated October 10, 1972

Inventor(s) Howard F. Banks

It is certified that error appears in the above-identified patent and that said Letters Patent are hereby corrected as shown below:

Column 4, Table 1, line 7, "Q output" should be -- $\overline{Q}$ output --.

Column 4, Table 1, line 14, "Q output" should be -- $\overline{Q}$ output --.

Column 5, line 39, delete "changes" and insert therefor -- change. --.

Column 7, Table II, line 2, after "142" insert -- 144 --.

Claim 19, line 36, "nOR" should be -- NOR --.

Signed and sealed this 8th day of May 1973.

(SEAL)
Attest:

EDWARD M.FLETCHER,JR.
Attesting Officer

ROBERT GOTTSCHALK
Commissioner of Patents